No. 866,441. PATENTED SEPT. 17, 1907.
W. H. DRIGGS.
APPARATUS FOR POINTING GUNS.
APPLICATION FILED MAY 28, 1906.
7 SHEETS—SHEET 4.
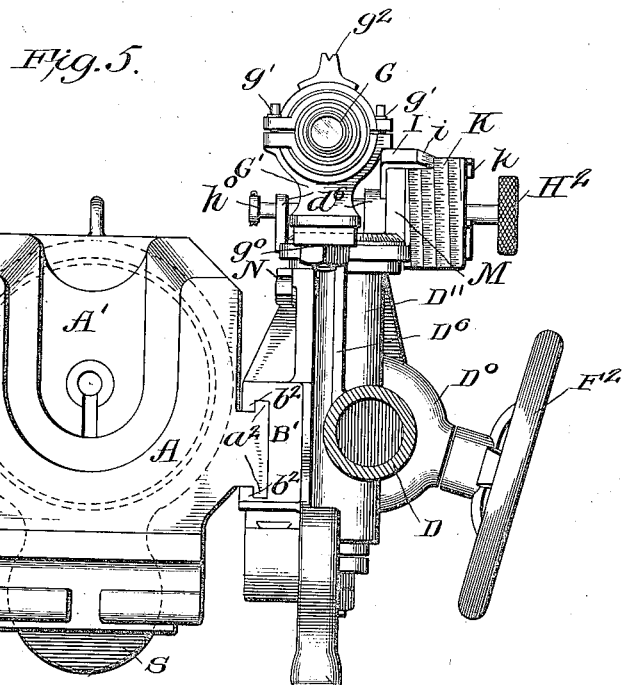
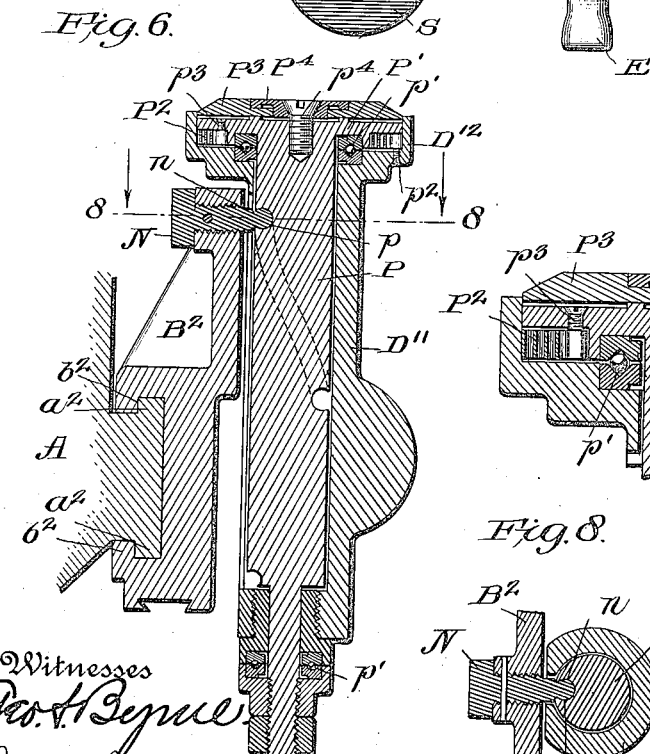
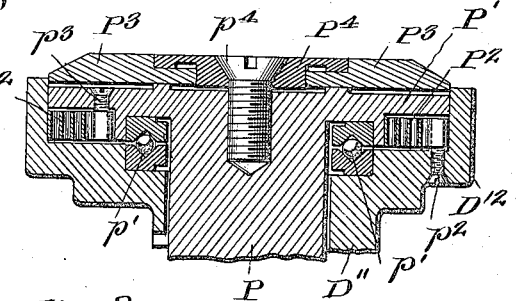
Witnesses
Inventor
W. H. Driggs,
Attorneys.

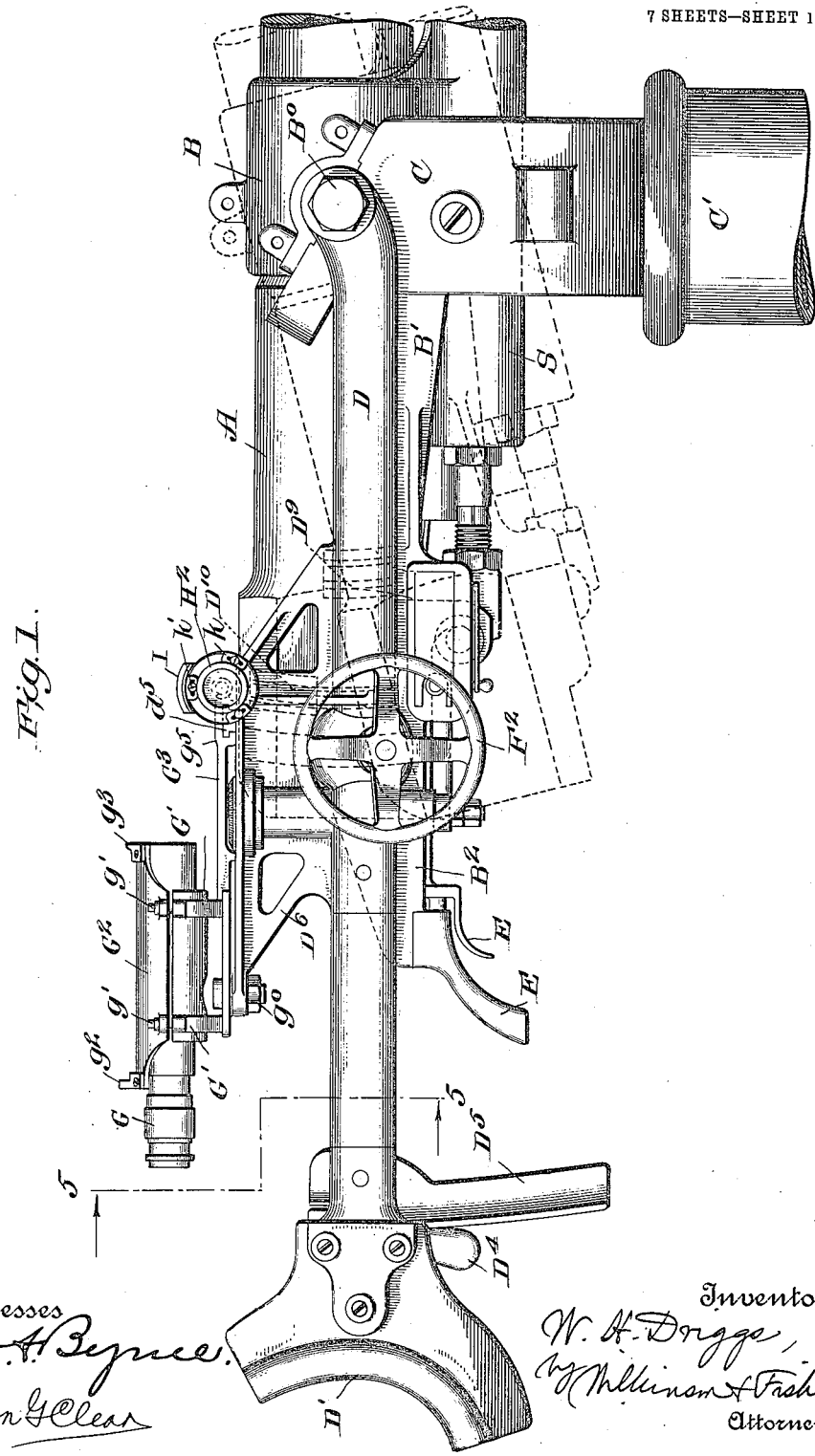

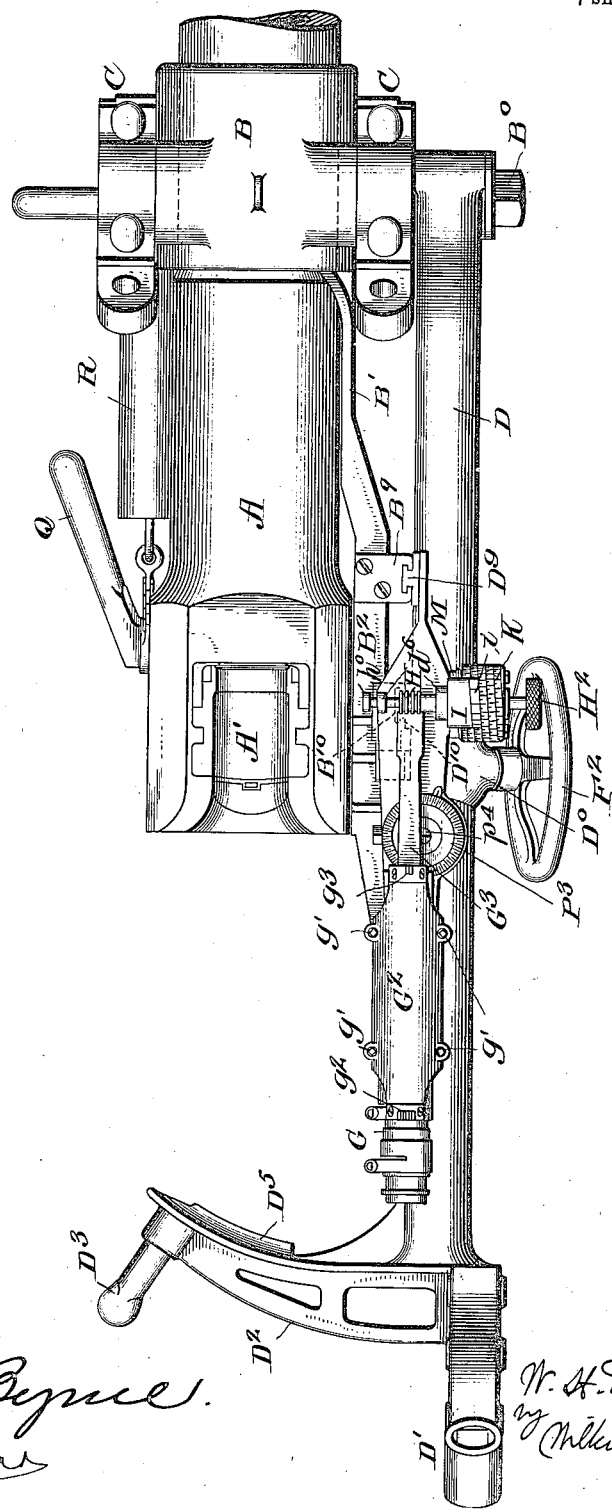

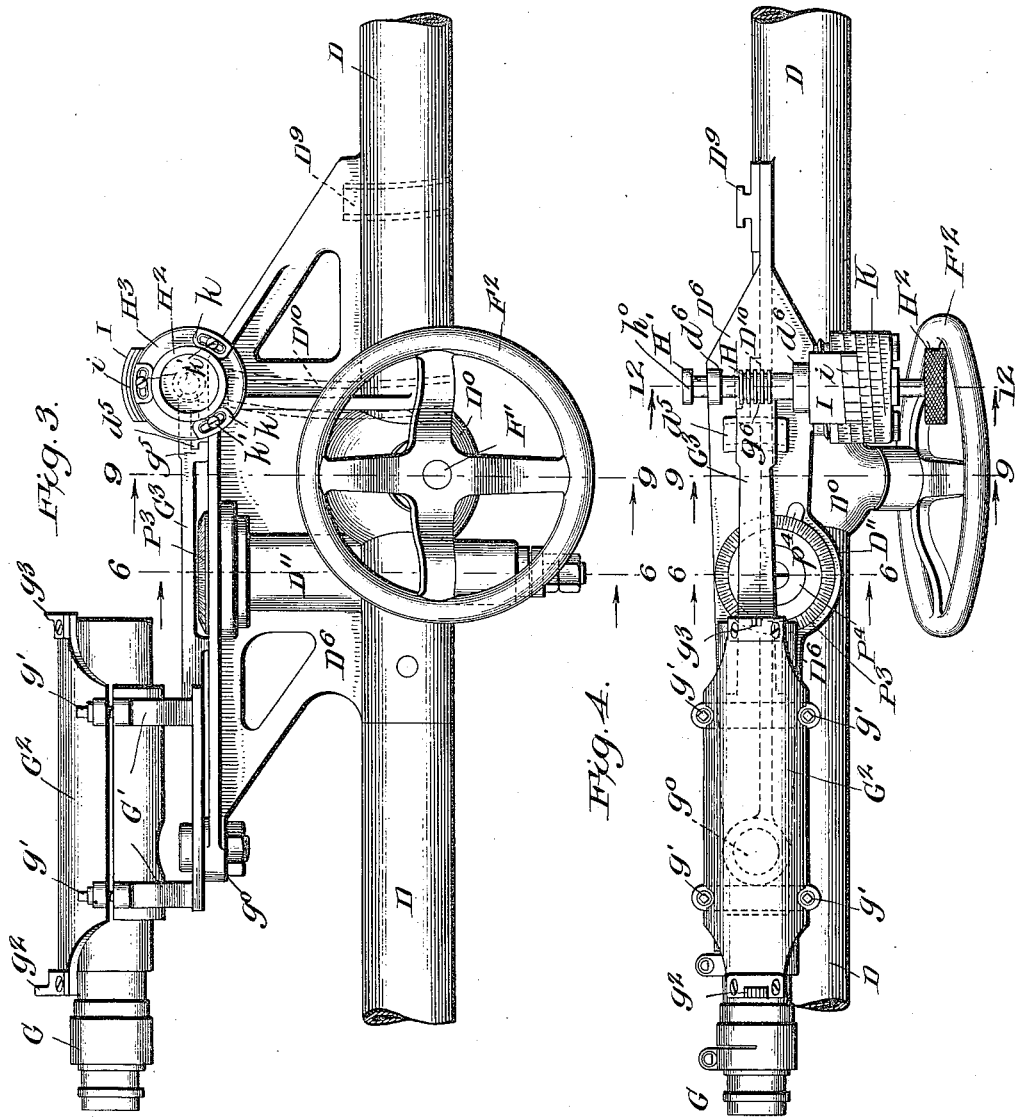

No. 866,441. PATENTED SEPT. 17, 1907.
W. H. DRIGGS.
APPARATUS FOR POINTING GUNS.
APPLICATION FILED MAY 28, 1906.
7 SHEETS—SHEET 6.
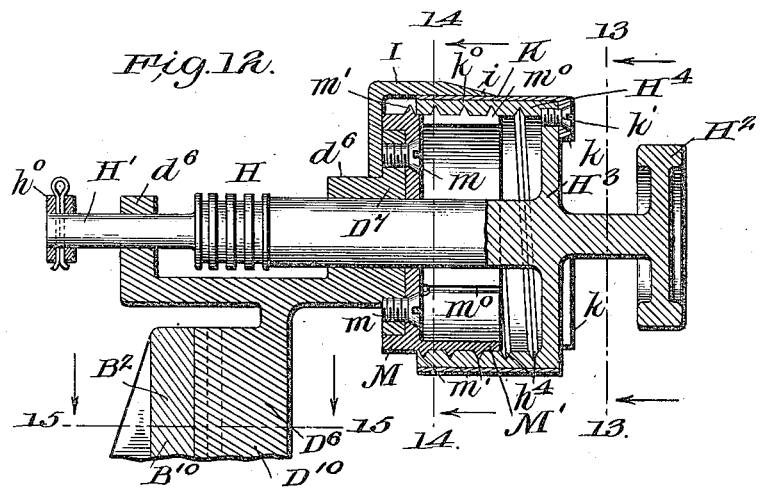

No. 866,441. PATENTED SEPT. 17, 1907.
W. H. DRIGGS.
APPARATUS FOR POINTING GUNS.
APPLICATION FILED MAY 28, 1906.

7 SHEETS—SHEET 7.

| | | RANGE IN YARDS | | | | |
|---|---|---|---|---|---|---|
| | | 1000 | 1500 | 2,000 | 3000 | 4000 |
| KNOTS PER HOUR. | 5 | 19 | 20 | 22 | 25 | 28 |
| | 10 | 39 | 41 | 44 | 50 | 56 |
| | 15 | 58 | 62 | 66 | 75 | 84 |
| | 20 | 77 | 83 | 88 | 100 | 112 |
| | 25 | 97 | 104 | 110 | 125 | 140 |
| | 30 | 116 | 125 | 132 | 150 | 168 |
| | 35 | 135 | 145 | 154 | 175 | 196 |
| | 40 | 155 | 166 | 176 | 200 | 224 |

Witnesses
Geo. A. Bynce
Myron F. Clear

Inventor
W. H. Driggs,
by Williamson & Fisher,
Attorneys.

UNITED STATES PATENT OFFICE.

WILLIAM HALE DRIGGS, OF WASHINGTON, DISTRICT OF COLUMBIA.

APPARATUS FOR POINTING GUNS.

No. 866,441.   Specification of Letters Patent.   Patented Sept. 17, 1907.

Application filed May 28, 1906. Serial No. 319,202.

*To all whom it may concern:*

Be it known that I, WILLIAM HALE DRIGGS, a citizen of the United States, residing at Washington, in the District of Columbia, have invented certain new and useful Improvements in Apparatus for Pointing Guns; and I do hereby declare the following to be a full, clear, and exact description of the invention, such as will enable others skilled in the art to which it appertains to make and use the same.

My present invention relates to improvements in apparatus for pointing and sighting guns, and is more especially intended to provide means whereby the gun may be quickly and accurately pointed.

The improved means for pointing the gun comprises mechanism for adjusting the gun in elevation and laterally while the line of sight is kept on the target, thus regulating the adjustment between the line of sight and the line of fire without taking the sight or sights off of the target.

The invention also consists in various other novel features and in novel arrangements and combinations of parts which will be hereinafter described and claimed.

Reference is had to the accompanying drawings, in which the same parts are indicated by the same letters throughout the several views.

Figure 9:
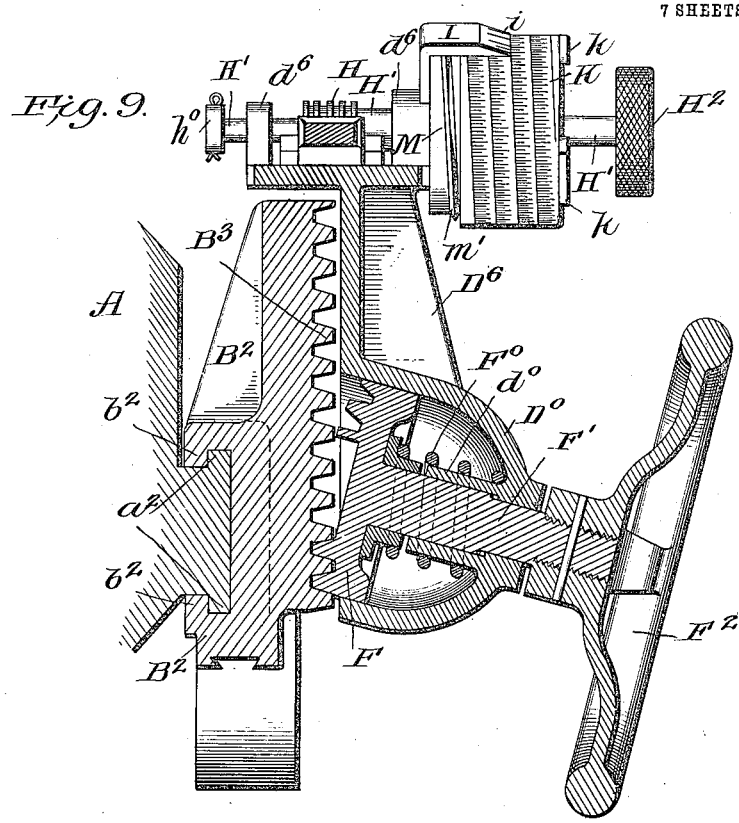
Figure 10:
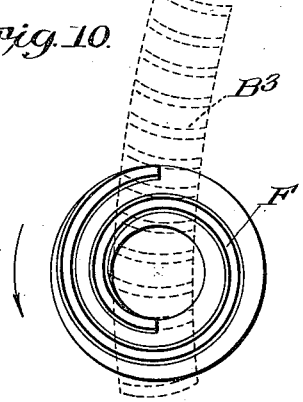
Figure 11:
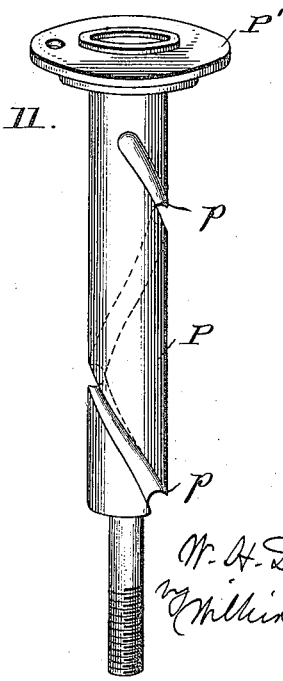
Figures 18, 19:
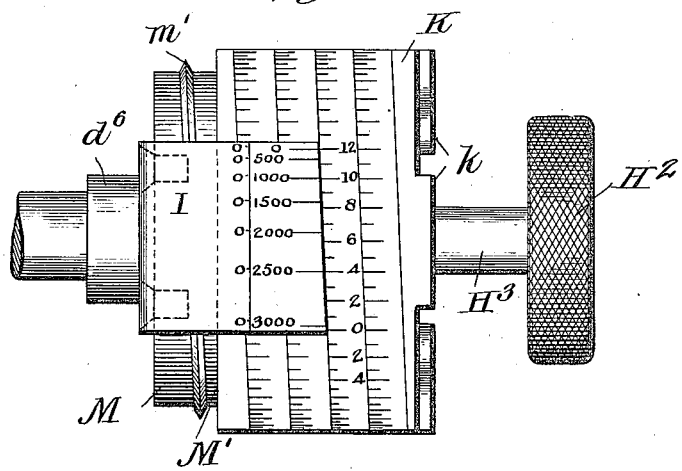

Figure 1 is a side elevation of the breech of the gun fitted with the improved apparatus. Fig. 2 is a plan view of the device shown in Fig. 1. Fig. 3 is a side elevation of part of the pointing apparatus on a larger scale than in the previous figures, and Fig. 4 is a plan view of the device shown in Fig. 3. Fig. 5 shows a section along the line 5—5 of Fig. 1 and looking in the direction of the arrows, parts not germane to the invention being omitted for the sake of clearness in the drawings. Fig. 6 shows a section along the line 6—6 of Figs. 3 and 4, and looking in the direction of the arrows; a part of the gun mount is also shown in this figure. The parts in Fig. 6 are shown on a larger scale than in any of the preceding figures. Fig. 7 is a detail on a still larger scale showing in section the range scale and the contiguous parts. Fig. 8 is a section along the line 8—8 of Fig. 6, and looking down. Fig. 9 is a section along the line 9—9 of Figs. 3 and 4, part of the gun mount being shown in section, and the parts being shown on an enlarged scale. Fig. 10 shows the scroll gear, and the engaging rack, whereby the gun is elevated or depressed relative to the line of sight. Fig. 11 is a detail showing in perspective the cam spindle for rotating the range scale or disk. Fig. 12 shows a section along the line 12—12 of Fig. 4, looking in the direction of the arrows, parts being shown in elevation. Fig. 13 is a section along the line 13—13 of Fig. 12 and looking in the direction of the arrows. Fig. 14 shows a section along the line 14—14 of Fig. 12 and looking in the direction of the arrows. Fig. 15 shows a section along the line 15—15 of Fig. 12 and looking in the direction of the arrows. Fig. 16 is a perspective view of the vernier for use with the drum for correcting for lateral errors. Fig. 17 is a perspective view of the hollow screw used in the apparatus for correcting for lateral errors. Fig. 18 is a plan view on an enlarged scale of the drum and vernier used in correcting for lateral errors, and Fig. 19 shows a plate carrying a table to assist in correcting lateral errors. This plate may be attached to any part of the gun or mount or to any object in the vicinage.

A represents the body of the gun having any suitable breech mechanism A'. This gun recoils in the sleeve or cradle B which is trunnioned in the yoke C of the mount C'. One of the trunnions of the cradle is prolonged as at B⁰ and revolubly mounted on this prolongation is the pointing arm D which carries the shoulder piece D' at its rear end. It is also provided with a bracket D² carrying the grips D³ and D⁴, for convenience in pointing the gun, and the deflector D⁵ which arrests the empty cartridge case when the latter is ejected rearward from the gun.

E represents the pistol grip of the firing mechanism and E' represents the trigger. The firing mechanism may be of any suitable type and will not be further described herein.

The bar D is provided with the web D⁶ and the hollow boss D⁰, see Figs. 3, 5, and 9. The sleeve B is provided with a rearwardly projecting arm B' terminating in the guide plate B² which is provided with ribs b² engaging the ribs a² of the gun body, as shown in Figs. 5, 6, and 9. This plate B² extends upwards towards the rear, as shown in Figs. 5, 6, and 9 and is provided with a scroll rack B³ shown in dotted lines in Fig. 10 which engages with the scroll gear F. This scroll gear is secured to or integral with the shaft F' to which is connected the handle F², see Fig. 9. This scroll gear is pressed into engagement with the rack B³ by means of the spring F⁰ which is mounted on the bearing d⁰ in the hollow boss D⁰. This shaft F' is set at an angle, as shown in Fig. 9 so that the lower portion of the scroll gear F may engage in the rack B³ and form a support for the rack, practically in the same vertical plane as the center of the gear. Owing to this part being immediately below the center of the gear, the downward thrust on the rack is always in the direction of the vertical axis of the gear, and there will be no tendency to jar the gear either to the right or left when the gun is fired. This is quite important because when the gun is fired, the weight is suddenly shifted back on the cradle and there is a tendency to jar the various pinions or worm gears or the like, now most generally in use, out of the nice adjustment required, and consequently these gears ordinarily require attention after each discharge of the gun. It will be seen that by turning the hand wheel F² to the right or left, the gun may be elevated or depressed, as desired, and at the same time when once set, the parts will not jar out of adjustment when the gun is fired. The sight or sights are normally kept on the target by the gun pointer at the shoulder piece D', and the line of fire is adjusted relative to the line of sight by the apparatus that will now be described.

This invention is especially intended for use on board ship where the gun platform is unstable and where it is desirable to keep the line of sight on the target no matter how much the ship may pitch or roll.

In order to correct for the variations in the angle between the line of sight and the line of fire, I provide wholly distinct apparatus for taking care of errors in the vertical and horizontal planes.

For compensating for errors in the vertical plane, I provide a cam cylinder P, shown in Figs. 6, 7, 8, and 11, which cylinder has a cam groove $p$ extending spirally thereon, and into this cam groove projects the rounded end $n$ of a pin N. This pin N is carried by the arm $B^2$ on the cradle, and as the rack $B^3$ is raised or lowered the cradle will be rocked about its trunnions, varying the relative direction of the line of fire and the line of sight, while at the same time the point $n$ will engage in the cam groove $p$ and will rotate the cam cylinder P, turning the plate $P^3$ carrying the range scale. This plate $P^3$ is adjustably connected to the flanged head of the cam cylinder P' by means of the plate $P^4$ and the clamp screw $p^4$, shown in detail in Figs. 6 and 7. In order to provide against lost motion, the head of the cam cylinder is connected to the part $D^{12}$ of the casing $D^{11}$ by means of the spiral spring $P^2$ and the screws $p^2$ and $p^3$. This spring should be set under tension so as to always hold the point $n$ against the same side of the cam groove $p$ and thus prevent any lateral vibration of the range scale $P^3$. Anti-friction bearings $p'$ for the cam cylinder P are preferably used. Thus it will be seen that the gun may be readily elevated or depressed by means of the hand wheel $F^2$, and that the relative movement of the shoulder bar and the cradle of the gun automatically rotates the range scale, and there is no lost motion in the range scale due to the spring connection between the cam cylinder carrying the range scale and the part attached to the shoulder bar, which carries the pin engaging in the cam groove.

In order to correct lateral deviations of the projectile, due to drift, speed of the gun platform and target, and force and direction of the wind, I provide the mechanism which will now be described.

G represents a telescopic sight mounted in the yokes G' carried by the bar $G^3$. To secure rigidity and strength, the telescope G may be clamped in the yokes G' beneath the plate $G^2$ by means of the screws $g'$, and this plate is preferably provided with rear and front sights $g^2$ and $g^3$, which may be used for coarse sighting, when desired. This bar $G^3$ is pivoted beneath the telescope, as at $g^0$, to the web $D^6$, and the front end of this bar $G^3$ carries the teeth $g^5$, which mesh with the annular collars H on the drum spindle H'. A plurality of teeth $g^5$ and collars H are provided so as to diminish wear or instrumental errors. This spindle H' is journaled in bearings $d^6$ carried by the web $D^6$, and has a limited longitudinal travel in said bearings, and carries at one end a washer $h^0$, and at the other the knurled head $H^2$ for turning the same by hand. This spindle H' carries a cylinder head $H^3$, to which is attached the nut or hollow cylinder $H^4$, which hollow cylinder is interiorly screw threaded, as at $h^4$, and carries on its outer face a cylindrical shell, which is adjustably secured to the cylinder by means of the slotted lugs $k$ and the screws $k'$, as shown most clearly in Figs. 12 and 13. This cylindrical shell K has a spiral scale graved thereon, with graduations beginning in the middle of the shell and extending in opposite directions, as shown most clearly in Fig. 18. The vernier I is secured to one of the bearings $d^6$, and projects over the spiral scale, as shown in Figs. 12, 16 and 18.

M represents a hollow screw, which is secured to one of the fixed bearings of the spindle, as shown in Fig. 12, and is provided with screw threads $m'$ engaging the screw threads $h^4$ on the interior of the cylinder $H^4$. This hollow screw is preferably slotted, as at $m^0$, and is made of resilient material, which tends to expand outwards in the nut or cylinder $H^4$, and thus compensates for any wear on the screw threads, and prevents the cylinder $H^4$ from wearing loose on the screw M. This prevents the scale from being affected by jars, such as take place when the gun is fired. It will be noted that if the knurled head $H^2$ be turned it will turn the hollow cylinder $H^4$ on the screw M, and this screw M being fixed, the spindle H' will be given a longitudinal motion. This longitudinal motion will cause the collars H, engaging the teeth $g^5$, to move the bar $G^3$ through a small angle about its pivot $g^0$, and this motion of the bar will move the axis of the telescope through a small angle in the horizontal plane. Thus by turning the knurled head $H^2$ in one direction or the other, compensation can be made for lateral deviations of the flight of the projectile to right or left of the target.

The table shown in Fig. 19 is intended to provide means for compensating for the retardation of the projectile at varying ranges.

As is well known in the art of naval gunnery, allowance must be made not only for the force of the wind blowing across the line of fire, but also for the algebraic sum of the components of speeds of the gun platform and of the target, measured at right angles to the line of fire. In other words, where the vessel shooting and the vessel aimed at are moving in opposite directions, the sum of the components of their velocities at right angles to the line of fire must be compensated for; when they are moving in the same direction, the difference of these components must be compensated for.

The effects of the wind and of the speed of the ships are generally allowed for by an approximate estimate measured in knots per hour. Since it is fairly to be assumed that the force of the wind and the relative speed of the gun platform and of the target will remain constant during the brief flight of any one projectile, it would be a simple matter to adjust for lateral deviation by the use of similar triangles, were it not for the fact that the resistance of the air causes a very decided retardation in the flight of the projectile. Owing to this retardation, a greater compensation must be given for lateral errors at long ranges, where the other factors are the same, than would be necessary for shorter ranges; and for this reason the table of compensations shown on the plate R of Fig. 19, shows considerably greater allowance at long ranges than at short ones; for instance if the compensation for wind and speed is estimated as necessary for a speed of 20 knots per hour, then at 1000 yards of range the drum K would be turned through 77 graduations to the right or left, as the case might be, while at 4000 yards the drum would be turned through 112 graduations, the difference being due to the additional allowance required for the longer range. This additional compensation can thus be conveniently applied to a drum having equidistant graduations. For convenience, these graduations preferably represent minutes of horizontal arc through which the telescope is turned.

The drift of the projectile is compensated for by the adjustment of the drum K relative to the vernier I. This vernier is provided with a number of zero points corresponding to the varying ranges, such as point blank or zero, 500 yards or meters, 1000 yards or meters, and so on, as shown in Fig. 18. In order to correct for the drift at any desired range, it will only be necessary to turn the zero point of the drum to the zero point of the vernier corresponding to that particular range. Thus, for instance, if it is desired to allow for drift at 2000 yards of range, turn the zero point of the drum K to the zero opposite the mark 2000. This will cause the interior screw threads $k^0$ to engage the screw threads $m'$, and these latter being fixed, the shaft $H^3$ will be moved longitudinally, causing the collars H to pull the teeth $g^6$ to the right, thus throwing the line of sight slightly to the right of the line of fire. This will correct for drift with right hand rifling. With left hand rifling the correction should be made in the reverse direction. The correction just made applies to drift only, and the other corrections for lateral errors should be then applied corresponding to the column "Knots per Hour" and the "Range in Yards" in the table shown in Fig. 19. Thus it will be seen that I provide an apparatus in which the mere act of elevating or depressing the gun automatically operates the range scale, and in which the range scale is held steady irrespective of the shocks and jars occasioned by the firing of the gun, and in which lost motion is guarded against, and furthermore, in which the parts for operating the range scale are in a protected position, and are not likely to be injured by carelessness in manipulating the gun. It will also be seen that I provide simple and efficient apparatus for compensating for lateral errors in the flight of the projectile, which can be readily adjusted, and which do not require any special calculations, or any high degree of intelligence in the ordinary use thereof.

In all apparatus connected with guns, it is especially desirable to do away, as far as possible, with the necessity for any elaborate system of adjustments, or for the exercise of any unnecessary amount of discretion in the time of excitement when the gun is relied upon to do its most effective work.

I have shown in Fig. 2 an operating handle Q for operating the breech block A', and also a casing R for containing parts of a semi-automatic attachment, and in other figures I have shown a recoil cylinder S, and the parts E and E' of the firing mechanism, but all of these details are merely included to show a complete structure, but are not a part of my present invention, and will not be further described. Any suitable gun, breech mechanism, and firing mechanism may be used with the pointing and sighting apparatus hereinbefore described and hereinafter claimed.

It will be obvious that various modifications in the herein described apparatus might be made, which could be used without departing from the spirit of my invention.

Having thus described my invention, what I claim and desire to secure by Letters Patent of the United States, is:—

1. In a pointing apparatus for guns, the combination with the gun mount, of the cradle trunnioned therein, and provided with a rearwardly extending arm, a shoulder bar journaled to swing about the axis of said trunnions, elevating gear connecting said shoulder bar and said arm on said cradle for varying the elevation of the gun relative to said shoulder bar, a sight or sights carried by said bar, a cam cylinder carried by said shoulder bar and provided with a spiral cam groove on its exterior, a pin carried by said arm and engaging said spiral groove, and a range scale carried by said cam cylinder and rotated by the engagement of said pin and groove as the elevating gear is operated, substantially as described.

2. In a pointing apparatus for guns, the combination with the gun mount, of the cradle trunnioned therein, and provided with a rearwardly extending arm, a shoulder bar journaled to swing about the axis of said trunnions, elevating gear connecting said shoulder bar and said arm on said cradle for varying the elevation of the gun relative to said shoulder bar, a sight or sights carried by said bar, a cam cylinder carried by said shoulder bar and provided with a spiral cam groove on its exterior, a pin carried by said arm and engaging said spiral groove, and a range scale carried by said cam cylinder and rotated by the engagement of said pin and groove as the elevating gear is operated, with independent means for moving said sight or sights through an angle laterally, substantially as described.

3. In a pointing apparatus for guns, the combination with the gun mount, of the cradle trunnioned therein, and provided with a rearwardly extending arm, a shoulder bar journaled to swing about the axis of said trunnions, elevating gear connecting said shoulder bar and said arm on said cradle for varying the elevation of the gun relative to said shoulder bar, a telescopic sight carried by said bar, a cam cylinder carried by said shoulder bar and provided with a spiral cam groove on its exterior, a pin carried by said arm and engaging said spiral groove, and a range scale carried by said cam cylinder and rotated by the engagement of said pin and groove as the elevating gear is operated, with independent means for swinging the said sight through a small angle laterally relative to said shoulder bar, substantially as described.

4. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear comprising a scroll rack and a scroll gear connecting said shoulder bar and said arm on said cradle for varying the elevation of the gun relative to said shoulder bar, the said rack and gear engaging substantially in the plane of the vertical axis of the scroll gear, substantially as described.

5. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear comprising a scroll rack and a scroll gear connecting said shoulder bar and said arm on said cradle for varying the elevation of the gun relative to said shoulder bar, a sight or sights carried by said bar, and means automatically operated by the elevating gear for indicating the range corresponding to any given movement of said gear, substantially as described.

6. In a pointing apparatus for guns, the combination with the gun mount, of the cradle trunnioned therein, and provided with a rearwardly extending arm, provided with guides engaging the gun body, a shoulder bar journaled to swing about the axis of said trunnions, elevating gear comprising a scroll rack and a scroll gear connecting said shoulder bar and said arm on said cradle for varying the elevation of the gun relative to said shoulder bar, a sight or sights carried by said bar, and means automatically operated by the elevating gear for indicating the range corresponding to any given movement of said gear, with independent means for moving said sight or sights through an angle laterally, substantially as described.

7. In a pointing apparatus for guns, the combination with the gun mount, of the cradle trunnioned therein, and provided with a rearwardly extending arm, provided with guides engaging the gun body, a shoulder bar journaled to swing about the axis of said trunnions, elevating gear comprising a scroll rack and a scroll gear connecting said shoulder bar and said arm on said cradle for varying the elevation of the gun relative to said shoulder bar, a sight or sights carried by said bar, a cam cylinder carried by said shoulder bar and provided with a cam groove on its exterior, a pin carried by said arm and engaging said groove, and a range scale carried by said cam cylinder and rotated by the engagement of said pin and groove as the elevating gear is operated, substantially as described.

8. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear comprising a scroll rack and a scroll gear connecting said shoulder bar and said arm on said cradle for varying the elevation of the gun relative to said shoulder bar, a sight or sights carried by said bar, a cam cylinder carried by said shoulder bar and provided with a cam groove on its exterior, a pin carried by said arm and engaging said groove, and a range scale adjustably mounted on said cam cylinder and rotated by the engagement of said pin and groove as the elevating gear is operated, and independent means for moving said sight or sights through an angle laterally, substantially as described.

9. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear comprising a scroll rack and a scroll gear connecting said shoulder bar and said arm on said cradle for varying the elevation of the gun relative to said shoulder bar, a sight or sights carried by said bar, a cam cylinder carried by said shoulder bar and provided with a spiral cam groove on its exterior, a pin carried by said arm and engaging said spiral groove, and a range scale carried by said cam cylinder and rotated by the engagement of said pin and groove as the elevating gear is operated, with independent means carried by said bar for swinging the said sight or sights through a small angle laterally relative to said shoulder bar, substantially as described.

10. In a pointing apparatus for guns, the combination with the gun mount, of the cradle trunnioned therein, and elevating gear comprising a scroll rack and a scroll gear for varying the elevation of the cradle, the said rack and gear engaging substantially in the plane of the vertical axis of the scroll gear, substantially as described.

11. In a pointing apparatus for guns, the combination with the gun mount, of the cradle trunnioned therein, elevating gear comprising a scroll rack and a scroll gear for varying the elevation of the cradle, the said rack and gear engaging substantially in the plane of the vertical axis of the scroll gear, a sight or sights, and means automatically operated by the elevating gear for indicating the range corresponding to any given movement of said gear, substantially as described.

12. In a pointing apparatus for guns, the combination with the gun mount, of the cradle trunnioned therein, elevating gear comprising a scroll rack and a scroll gear for varying the elevation of the cradle, a sight or sights, and means automatically operated by the elevating gear for indicating the range corresponding to any given movement of said gear, with independent means for moving said sight or sights through an angle laterally, substantially as described.

13. In a pointing apparatus for guns, the combination with the gun mount, of the cradle trunnioned therein, and provided with a rearwardly extending arm, provided with guides engaging the gun body, a pointing arm journaled to swing about the axis of said trunnions, elevating gear connecting said pointing arm and said arm on said cradle for varying the elevation of the gun relative to said pointing arm, a sight or sights carried by said pointing arm, a cam cylinder also carried by said pointing arm and provided with a cam groove on its exterior, a pin carried by said arm on the cradle and engaging said groove, and a range scale carried by said cam cylinder and rotated by the engagement of said pin and groove as the elevating gear is operated, substantially as described.

14. In a pointing apparatus for guns, the combination with the gun mount, of the cradle trunnioned therein, and provided with a rearwardly extending arm, provided with guides engaging the gun body, a pointing arm journaled to swing about the axis of said trunnions, elevating gear connecting said pointing arm and said arm on said cradle for varying the elevation of the gun relative to said pointing arm, a sight or sights carried by said pointing arm, a cam cylinder also carried by said pointing arm and provided with a cam groove on its exterior, a pin carried by said arm on the cradle and engaging said groove, a range scale adjustably mounted on said cam cylinder and rotated by the engagement of said pin and groove as the elevating gear is operated, and independent means for moving said sight or sights through an angle laterally, substantially as described.

15. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear connecting said shoulder, and said arm on said cradle for varying the elevation of the gun relative to said shoulder bar, a sight or sights carried by said bar, a cam cylinder carried by said shoulder bar and provided with a spiral cam groove on its exterior, a pin carried by said arm and engaging said spiral groove, and a range scale carried by said cam cylinder and rotated by the engagement of said pin and groove as the elevating gear is operated, with independent means carried by said bar for swinging the said sight or sights through a small angle laterally relative to said shoulder bar, substantially as described.

16. In a pointing apparatus for guns, the combination with the gun mount, of the cradle trunnioned therein, and provided with a rearwardly extending arm, a shoulder bar journaled to swing about the axis of said trunnions, elevating gear connecting said shoulder bar and said arm on said cradle for varying the elevation of the gun relative to said shoulder bar, a telescope sight pivoted to swing laterally upon said bar, means automatically operated by the elevating gear for indicating the range corresponding to any given movement of said gear, and independent means for swinging said telescope through a small angle laterally, substantially as described.

17. In a pointing apparatus for guns, the combination with the gun mount, of the cradle trunnioned therein, and provided with a rearwardly extending arm, a shoulder bar journaled to swing about the axis of said trunnions, elevating gear connecting said shoulder bar and said arm on said cradle for varying the elevation of the gun relative to said shoulder bar, a sight or sights carried by said bar, a cam cylinder carried by said shoulder bar and provided with a spiral cam groove its exterior, a pin carried by said arm and engaging said spiral groove, and a circular range scale adjustably mounted on said cam cylinder and automatically rotated by the engagement of said pin and groove as the elevating gear is operated, substantially as described.

18. In a pointing apparatus for guns, the combination with the gun mount, of the cradle trunnioned therein, and provided with a rearwardly extending arm, a shoulder bar 160 journaled to swing about the axis of said trunnions, elevating gear connecting said shoulder bar and said arm on said cradle for varying the elevation of the gun relative to said shoulder bar, a sight or sights carried by said bar, a rotary range scale carried by said bar, and a cam arrangement operated by the relative movement of said arm and said bar for automatically rotating said range scale as the elevating gear is operated, substantially as described.

19. In a pointing apparatus for guns, the combination with the gun mount, of the cradle trunnioned thereon, and provided with a rearwardly extending arm, a shoulder bar journaled to swing about the axis of said trunnions, elevating gear connecting said shoulder bar and said arm on said cradle for varying the elevation of the gun relative to said shoulder bar, a sight or sights carried by said bar, a rotary range scale carried by said bar, and a cam arrangement operated by the relative movement of said arm and said bar for automatically rotating said range scale as the elevating gear is operated, with independent means for swinging the said sight or sights through a small angle laterally relative to said shoulder bar, substantially as described.

20. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, means for rotating said shaft and said scale, and means for feeding said shaft longitudinally in opposite directions when said shaft is rotated, substantially as described.

21. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, means for rotating said shaft and said scale, and a screw threaded engagement between said shaft and said arm whereby said shaft may be moved longitudinally relative to said arm, substantially as described.

22. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, means for rotating said shaft and said scale, a screw carried by said arm, and a nut carried by said shaft engaging said screw, whereby said shaft is moved longitudinally when it is turned, substantially as described.

23. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, a graduated vernier for said scale, means for rotating said shaft and said scale, and means for feeding said shaft longitudinally in opposite directions when said shaft is rotated, substantially as described.

24. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, a graduated vernier for said scale, means for rotating said shaft and said scale, and a screw threaded engagement between said shaft and said arm whereby said shaft may be moved longitudinally relative to said arm, substantially as described.

25. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, a graduated vernier for said scale, means for rotating said shaft and said scale, a screw carried by said arm, and a nut carried by said shaft engaging said screw, whereby said shaft is moved longitudinally when it is turned, substantially as described.

26. In an apparatus for pointing guns, the combination with a pointing arm, and elevating gear for connecting the same to the cradle of the gun, of a bar pivoted on said pointing arm, and provided with teeth at one end thereof, a sight or sights carried by said bar, a shaft journaled on said arm and provided with collars engaging said teeth for rocking the bar through a small angle laterally, a scale for lateral errors carried by said shaft, means for rotating said shaft and said scale, and means for feeding said shaft longitudinally in reverse directions when said shaft is rotated, substantially as described.

27. In an apparatus for pointing guns, the combination with a pointing arm, and elevating gear for connecting the same to the cradle of the gun, of a bar pivoted on said pointing arm, and provided with teeth at one end thereof, a sight or sights carried by said bar, a shaft journaled on said arm and provided with collars engaging said teeth for rocking the bar through a small angle laterally, a scale for lateral errors carried by said shaft, means for rotating said shaft and said scale, and a screw threaded engagement between said shaft and said arm whereby said shaft may be moved longitudinally relative to said arm, substantially as described.

28. In an apparatus for pointing guns, the combination with a pointing arm, and elevating gear for connecting the same to the cradle of the gun, of a bar pivoted on said pointing arm, and provided with teeth at one end thereof, a sight or sights carried by said bar, a shaft journaled on said arm and provided with collars engaging said teeth for rocking the bar through a small angle laterally, a scale for lateral errors carried by said shaft, means for rotating said shaft and said scale, a screw carried by said arm, and a nut carried by said shaft engaging said screw, whereby said shaft is moved longitudinally when it is turned, substantially as described.

29. In an apparatus for pointing guns, the combination with a pointing arm, and elevating gear for connecting the same to the cradle of the gun, of a bar pivoted on said pointing arm, and provided with teeth at one end thereof, a sight or sights carried by said bar, a shaft journaled on said arm and provided with collars engaging said teeth for rocking the bar through a small angle laterally, a scale for lateral errors carried by said shaft, a graduated vernier for said scale carried by said pointing arm, means for rotating said shaft and said scale, and means for feeding said shaft longitudinally in reverse directions when said shaft is rotated, substantially as described.

30. In an apparatus for pointing guns, the combination with a pointing arm, and elevating gear for connecting the same to the cradle of the gun, of a bar pivoted on said pointing arm, and provided with teeth at one end thereof, a sight or sights carried by said bar, a shaft journaled on said arm and provided with collars engaging said teeth for rocking the bar through a small angle laterally, a scale for lateral errors carried by said shaft, a graduated vernier for said scale carried by said pointing arm, means for rotating said shaft and said scale, and a screw threaded engagement between said shaft and said arm whereby said shaft may be moved longitudinally relative to said arm, substantially as described., 31. In an apparatus for pointing guns, the combination with a pointing arm, and elevating gear for connecting the same to the cradle of the gun, of a bar pivoted on said pointing arm, and provided with teeth at one end thereof, a sight or sights carried by said bar, a shaft journaled on said arm and provided with collars engaging said teeth for rocking the bar through a small angle laterally, a scale for lateral errors carried by said shaft, a graduated vernier for said scale carried by said pointing arm, means for rotating said shaft and said scale, a screw carried by said arm, and a nut carried by said shaft engaging said screw, whereby said shaft is moved longitudinally when it is turned, substantially as described.

32. In a pointing apparatus for guns, the combination with the gun mount, of the cradle trunnioned therein, and elevating gear comprising a scroll rack and a scroll gear for varying the elevation of the cradle, the scroll gear having its threads engaging said rack substantially in a vertical plane passing through the axis of the gear, substantially as described.

33. In a pointing apparatus for guns, the combination with the gun mount, of the cradle trunnioned therein, elevating gear comprising a scroll rack and a scroll gear for varying the elevation of the cradle, the scroll gear having its threads engaging said rack substantially in a vertical plane passing through the axis of the gear, a sight or sights, and means automatically operated by the elevating gear for indicating the range corresponding to any given movement of said gear, substantially as described.

34. In a pointing apparatus for guns, the combination with the gun mount, of the cradle trunnioned therein, elevating gear comprising a scroll rack and a scroll gear for varying the elevation of the cradle, the scroll gear having its threads engaging said rack substantially in a vertical plane passing through the axis of the gear, a sight or sights moving with said cradle, and means automatically operated by the elevating gear for indicating the range corresponding to any given movement of said gear, with independent means for moving said sight or sights through an angle laterally, substantially as described.

35. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear comprising a scroll rack fast to said arm and a scroll gear journaled in said shoulder bar with a hand wheel for turning said gear, the said rack and gear engaging substantially in the plane of the vertical axis of the scroll gear, substantially as described.

36. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear comprising a scroll rack fast to said arm and a scroll gear having its axis journaled at an inclination in said shoulder bar, with a hand wheel for turning said gear, the said rack and gear engaging substantially in the plane of the vertical axis of the scroll gear, substantially as described.

37. In a pointing apparatus for guns, the combination with the gun mount, of the cradle trunnioned therein, and provided with a rearwardly extending arm, provided with guides engaging the gun body, a shoulder bar journaled to swing about the axis of said trunnions, and elevating gear comprising a scroll rack fast to said arm and a scroll gear having its axis journaled at an inclination in said shoulder bar, a spring normally pressing said gear into engagement with said rack, with a hand wheel for turning said gear, the said rack and gear engaging substantially in the plane of the vertical axis of the scroll gear, substantially as described.

38. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a drum provided with a spiral scale for lateral errors carried by said shaft, means for rotating said shaft and said scale, and means for feeding said shaft longitudinally in opposite directions when said shaft is rotated, substantially as described.

39. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a drum provided with a spiral scale for lateral errors carried by said shaft, a vernier carried by said arm and coöperating with said scale, means for rotating said shaft and said scale, and means for feeding said shaft longitudinally in opposite directions when said shaft is rotated, substantially as described.

40. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, means for rotating said shaft and said scale, a hollow split screw made of resilient material carried by said arm, and a nut carried by said shaft and fitting over the split portion of said screw, with means for turning said nut on said screw, substantially as described.

41. In an apparatus for pointing guns, the combination with a pointing arm, and elevating gear for connecting the same to the cradle of the gun, of a bar pivoted on said pointing arm, a sight or sights carried by said bar, a shaft journaled on said arm and provided with means for engaging the said bar for rocking the same through a small angle laterally, a scale for lateral errors carried by said shaft, means for rotating said shaft and said scale, a hollow split screw made of resilient material carried by said arm, and a nut carried by said shaft and fitting over the split portion of said screw, with means for turning said nut on said screw, and a vernier carried by said arm and coöperating with said scale, substantially as described.

In testimony whereof, I affix my signature, in presence of two witnesses.

WILLIAM HALE DRIGGS.

Witnesses:
M. B. SIMPSON,
GEO. L. CARY.